Patented Apr. 5, 1949

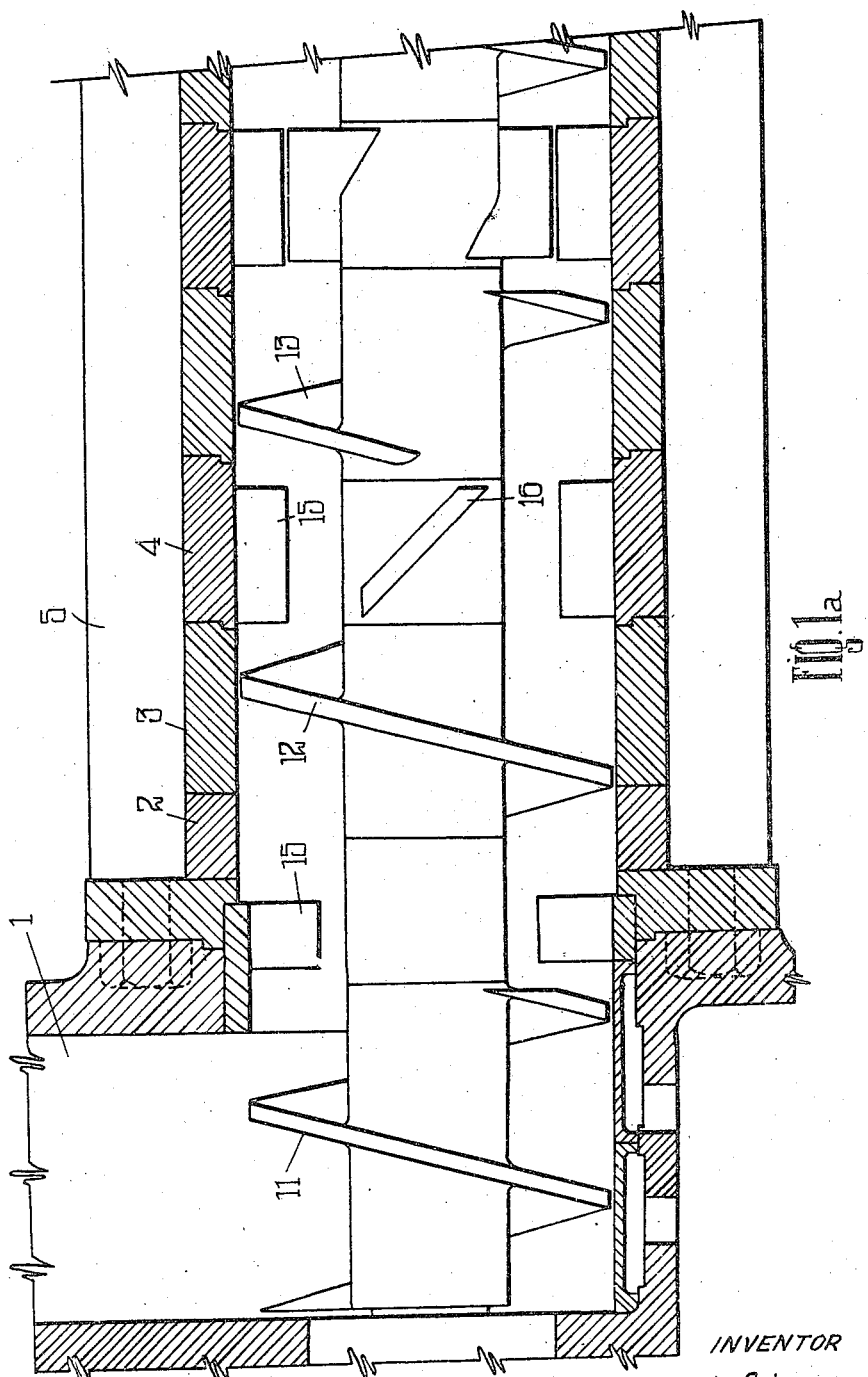

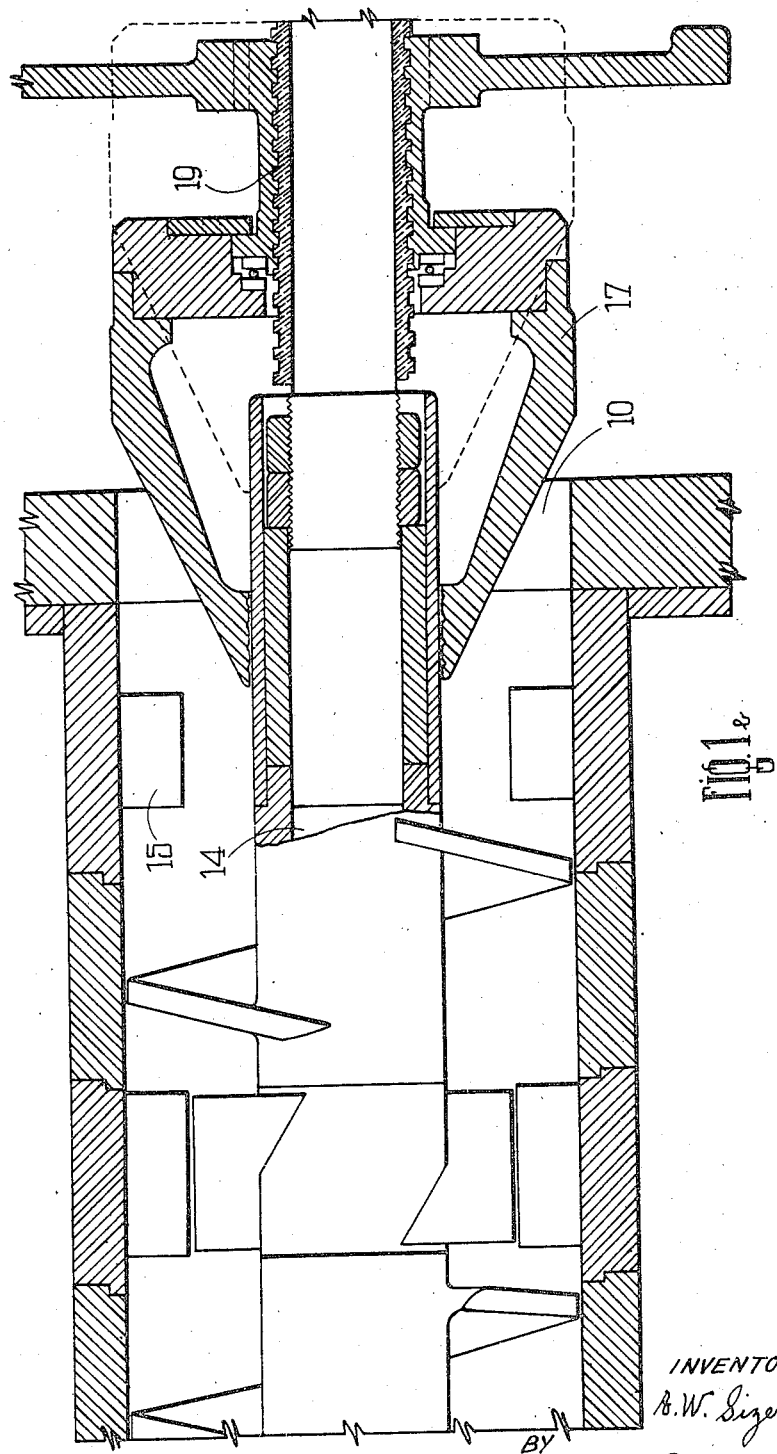

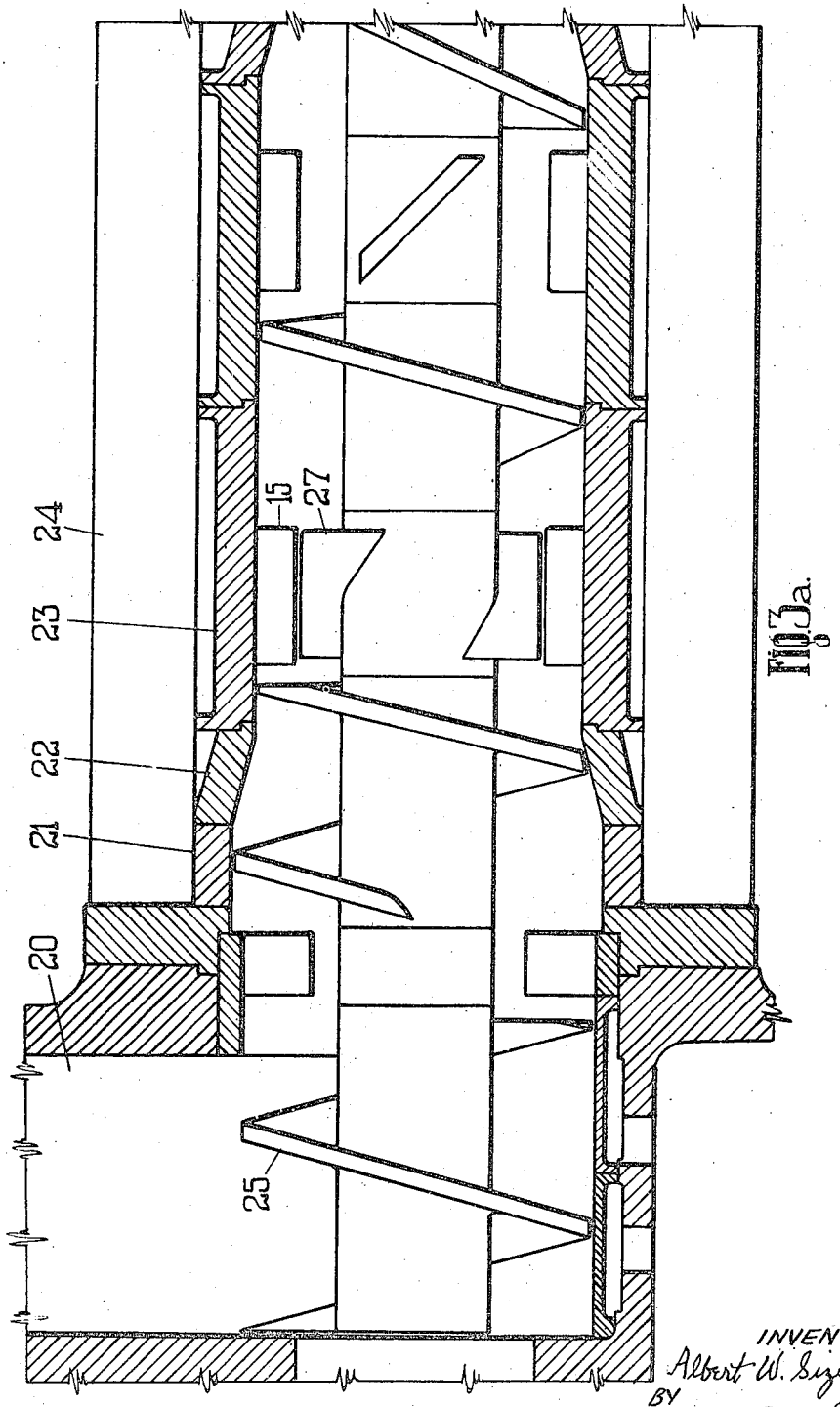

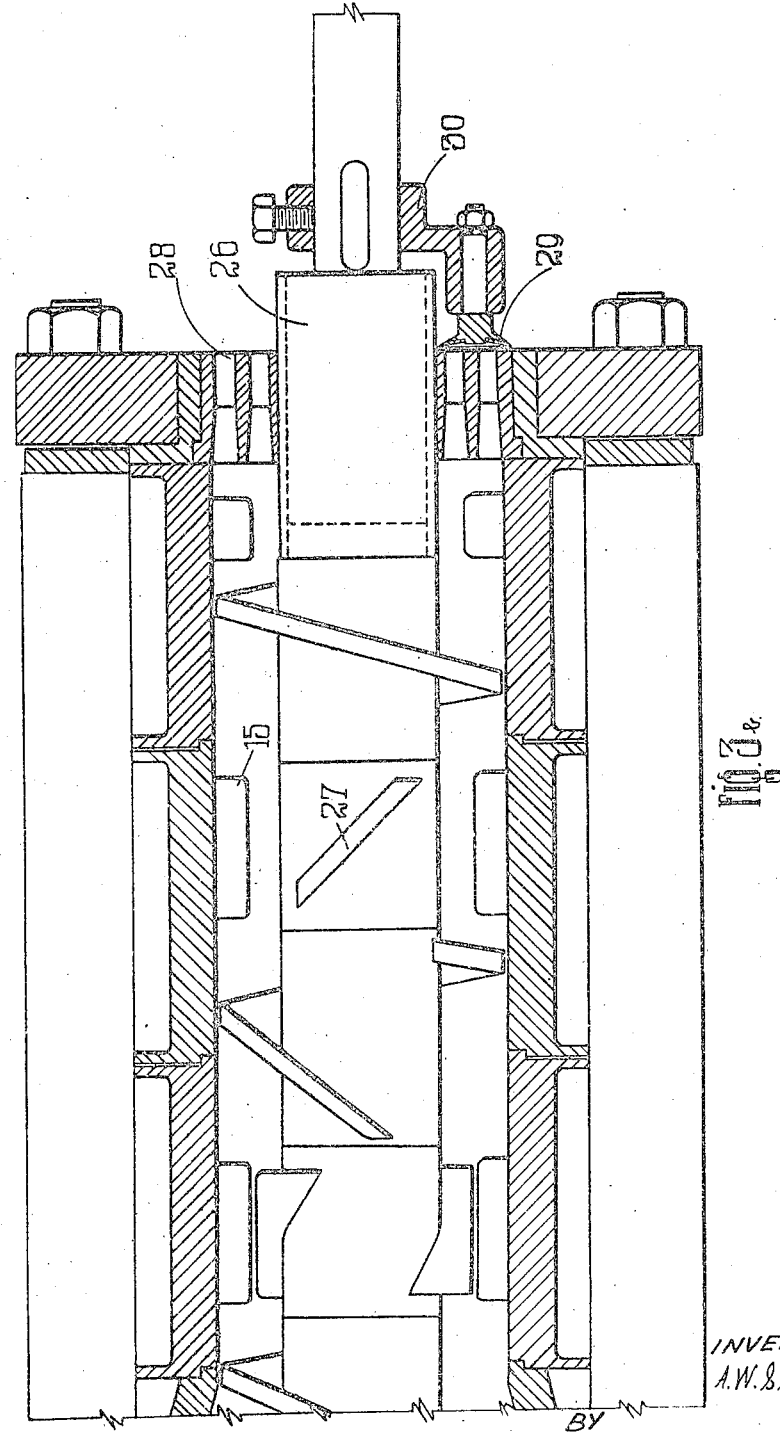

2,466,492

UNITED STATES PATENT OFFICE 2,466,492

EXTRACTION OF LIQUIDS FROM LIQUID CONTAINING MATERIALS

Albert William Sizer, Hessle, England

Application September 26, 1945, Serial No. 618,667
In Great Britain May 24, 1945

7 Claims. (Cl. 100—48)

The present invention relates to improvements in a method for and machines for the extraction of liquids from liquid bearing materials.

Whilst the invention is particularly applicable to the extraction of oil from vegetable seeds such as cotton seed or linseed, ground nuts and the like, fish meal and like oil bearing materials, it is also applicable to the extraction of water or other liquor from plastic materials containing the same.

The object of the present invention is to provide a method and apparatus for the extraction of liquid from liquid bearing plastic material which will remove a higher percentage of such liquid in a continuous process. Machines are known for extracting, for instance, oil from oil bearing seeds where the seeds usually contained in bags are subject to hydraulic pressure but these processes although extracting a desired percentage of oil from the material are not continuous processes, and are expensive in view of the necessity for bagging the material. It is, of course, also known to displace meals or again oil bearing seeds along a perforated chamber by means of a worm either formed as a continuous helix or as a plurality of spaced helices on a common shaft, but although these machines possess the advantage of acting on material continuously and avoid also the cost of bagging as in the hydraulic process yet they have not hitherto been able to extract the desired proportion of other liquid from the material.

By the present invention a thrust is exerted on the material at spaced points along a perforated chamber during which time a contrary thrust of lesser degree also operates on the material in an opposite direction and at other spaced points so that the material as a whole nevertheless moves forward from one end to the other of the chamber.

The invention is further described with reference to the accompanying drawings in which:

Fig. 1a shows the left hand end of one form of a machine in sectional elevation, Fig. 1b shows the corresponding right hand view of such a machine in one form;

Fig. 3a is a left hand view of a modified form of machine in sectional elevation;

Fig. 3b is its corresponding right hand end,

Figure 2:
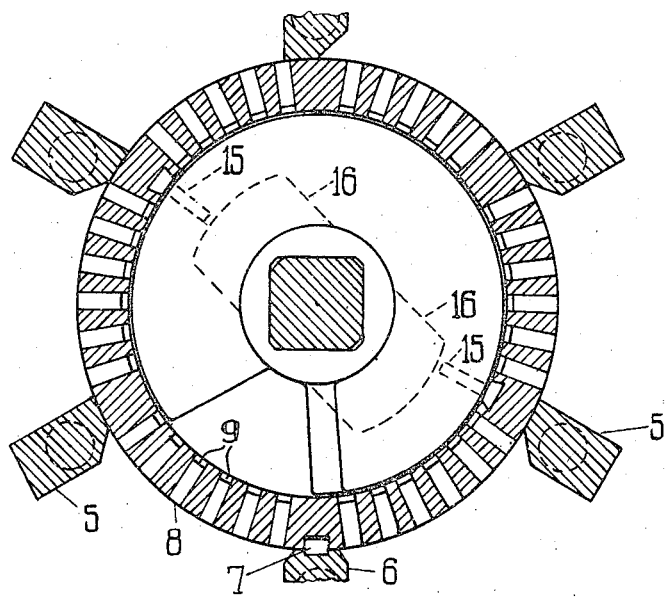
Fig. 2 is a sectional end view through the machine.

Plastic material from which liquid is to be removed, such, for instance, as water from paper pulp in paper making, or again oil from oil bearing seeds or other liquid from plastic material, can be fed to the inlet 1 of a chamber formed of a plurality of rings 2, 3, 4 . . . assembled within longitudinal staves 5, 6, which, for instance, can be keyed to stave 6 provided with a key 7 for preventing these rings turning about the axis of the cylindrical chamber formed by them. These rings are perforated as shown at 8 and the inner ends of these perforations may be partially obscured or blocked by means of plugs 9 having a lesser cross-sectional area than the perforation 8, that is to say, for instance, that the perforations 8 may be cylindrical, whilst the plugs 9 may be in the form of castellated discs, or again the perforations 8 may be fluted whilst the plugs 9 are in the form of cylindrical discs. It will, however, be appreciated that any other form of perforated cylinder may be used either made up in one piece or made up of a plurality of peripheral rings with interspaces or a plurality of longitudinal bars with interspaces therebetween as in the manner of known machines for the separation of oil from oil bearing seeds.

The material is transferred from the inlet on the machine to an outlet 10 by means of a conveyor worm comprising a plurality of spaced worm sections 11, 12, 13 . . . keyed to and rotating with the driving shaft 14, and disposed between any pair of worm sections, that is to say between the worm sections 11 and 12 or between the worm sections 12 and 13, taken by way of example, are breakers in the form of stationary projections 15, mounted on the fixed casing on the cylindrical chamber and projecting radially inwards. These breakers may be in the form of rectangular laminae or in certain cases may themselves be in the form of partial helices. Where these breakers 15 are in the form of partial helices they will preferably be of opposite pitch to the pitch of the worm sections 11, 12.

Opposite to certain or all of the breaker projections 15 there is disposed, keyed to, and driven by the shaft 14, blade sections 16 having a pitch opposed to the pitch of the worm sections 11, 12, 13 . . . . The pitch of these blade sections 16 may either be equal to or different from the pitch of the blade sections 11, 12, 13 . . . but in any event are opposite thereto.

It will consequently be seen that material taken up from the inlet 1 will receive a thrust along the cylindrical chamber formed by the rings 2, 3, 4 . . . by the worm section 11 in a direction from left to right of the drawings (Figs. 1a and 1b), the material then being subject to resistance by the first set of breaker fingers or projections 15, and then as the material travels further along the cylindrical chamber when it reaches the blade sections 16 these blade sections will tend to feed it in a direction from right to left of the chamber of Figs. 1a and 1b. The area of these blade sections 16 and their pitch angle is such that their backward thrust is less than, and a proportion of, the forward thrust by the helical sections 12, 13 . . . as the case may be. It has been found that this alternate thrust in one direction and partial reverse thrust in the opposite direction is particularly efficacious in breaking down the cell walls of material such as oil bearing seeds, allowing for the oil or other liquid in the plastic material to be extracted therefrom whereupon it can flow out of the chamber through the perforations 8; the discharge of fibrous material from the cylinder along its length is, however, arrested by the plugs 9.

After the material has been subject to a number of repeated forward thrusts by the worm sections 11, 12, 13 and repeated reverse thrusts by the blade section 16, it is discharged from the end 10 of the cylindrical chamber past an adjustable cone plug 17, preferably axially adjustable along a threaded sleeve 19 disposed coaxially of the driving shaft 14.

In the modified form of construction shown in Figs. 3a and 3b, the material is similarly taken up from the inlet 20 to the extraction chamber formed of a plurality of rings 21, 22, 23 . . . similarly held in position by longitudinal staves 24, by means of a worm section 25 on a driving shaft 26 and is similar to the construction of Figs. 1a and 1b subject to periodic reverse thrusts by blade sections 27 on this shaft 26.

In the arrangement shown, however, the cylinder has not the same diameter throughout its length but is formed by a plurality of sections, some of which as shown by the ring 21 are of larger diameter than the section of the chamber formed by the ring 23, these sections being connected by conical shaped sections 22.

Figure 4:
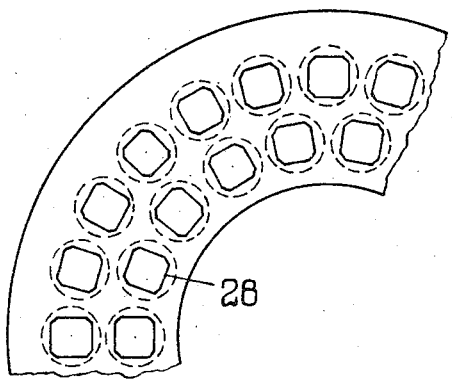
Fig. 4 is an outside end view of a machine according to Figs. 3a and 3b.

Instead of forcing the material past a conical plug as was described with reference to Figs. 1a and 1b, the material may finally be discharged through a die plate shown in end view in Fig. 4, which die plate may have perforations 28 of any convenient form shown rectangular purely by way of example. The material, therefore, freed of its liquor contact, such as oil, to a desired degree, will be extruded from these perforations 28 in the form of bars which can be conveniently severed into short length to form cakes or cubes by means of a rotating knife 29 mounted on a bracket 30 on the shaft 26.

I declare that what I claim is:

1. A machine for extracting liquid from plastic material consisting of a perforated cylindrical chamber, a driving shaft in said chamber, a plurality of conveyor worm sections of positive pitch in spaced groups mounted on said shaft, and a number of inclined blades of opposite pitch disposed intermediate said worm sections and of an area and inclination such that the rearward thrust they exert on the material in the chamber is of lesser degree than the forward thrust on said material by said positive worm sections.

2. A machine for extracting liquid from plastic material consisting of a perforated cylindrical chamber, a driving shaft in said chamber, a plurality of conveyor worm sections of positive pitch in spaced groups mounted on said shaft, and a number of inclined blades of opposite pitch also mounted on said shaft and disposed intermediate said worm sections and of an area and inclination such that the rearward thrust they exert on the material in the chamber is of lesser degree than the forward thrust on said material by said positive worm sections.

3. A machine for extracting liquid from plastic material consisting of a perforated cylindrical chamber, a driving shaft in said chamber, a plurality of conveyor worm sections of positive pitch in spaced groups mounted on said shaft, a number of inclined blades of opposite pitch also mounted on said shaft and disposed intermediate said worm sections and of an area and inclination such that the rearward thrust they exert on the material in the chamber is of lesser degree than the forward thrust on said material by said positive worm sections, and a number of fixed breaker blades mounted on said chamber disposed radially inwards to cooperate with said inclined blades.

4. A machine for extracting liquid from plastic material consisting of a number of separate elements assembled to form a chamber and presenting radial minute passages from the inside to the outside, a driving shaft in said chamber, a plurality of conveyor worm sections of positive pitch in spaced groups mounted on said shaft, and a number of inclined blades of opposite pitch also mounted on said shaft and disposed intermediate said worm sections and of an area and inclination such that the rearward thrust they exert on the material in the chamber is of lesser degree than the forward thrust on said material by said positive worm sections.

5. A machine for extracting liquid from plastic material consisting of a perforated cylindrical chamber, a driving shaft in said chamber, a plurality of conveyor worm sections of positive pitch in spaced groups mounted on said shaft, a number of inclined blades of opposite pitch also mounted on said shaft and disposed intermediate said worm sections and of an area and inclination such that the rearward thrust they exert on the material in the chamber is of lesser degree than the forward thrust on said material by said positive worm sections, a perforated die plate closing the outlet end of the chamber, and means cooperating with this die plate to sever material extruded therethrough into short lengths.

6. A machine for extracting liquid from plastic material consisting of a perforated cylindrical chamber, a driving shaft in said chamber, a plurality of conveyor worm sections of positive pitch in spaced groups mounted on said shaft, a number of inclined blades of opposite pitch also mounted on said shaft and disposed intermediate said worm sections and of an area and inclination such that the rearward thrust they exert on the material in the chamber is of lesser degree than the forward thrust on said material by said positive worm sections, a conical plug partly closing the outlet end of said chamber, and means to adjust said conical plug axially of the driving shaft.

7. A method of extracting liquids from plastic material consisting in conveying the material through a perforated chamber, exerting a thrust on the material at spaced points along the length of said chamber, simultaneously exerting a contrary thrust on the material of lesser degree and in opposite direction at other spaced points along the length of said chamber so that the material nevertheless is displaced from one end to the other of the chamber whilst liquid is exuded therefrom, and finally discharging from said chamber material freed from liquid.

ALBERT WILLIAM SIZER.

REFERENCES CITED

The following references are of record in the file of this patent:

UNITED STATES PATENTS

| Number | Name | Date |
|---|---|---|
| 1,049,834 | Fiddyment | Jan. 7, 1913 |
| 1,288,864 | Fowler | Dec. 24, 1918 |
| 1,762,368 | Vandergrift | June 10, 1930 |
| 1,919,229 | Lavett | July 25, 1933 |
| 2,334,015 | Levine et al. | Nov. 9, 1943 |
| 2,335,819 | Upton | Nov. 30, 1943 |